United States Patent [19]

Bühler et al.

[11] Patent Number: 4,713,516

[45] Date of Patent: Dec. 15, 1987

[54] PULSE GENERATOR FOR SPARK EROSIVE METAL WORKING

[75] Inventors: Ernst Bühler, Losone; Antonio Rullo, Giubiasco, both of Switzerland

[73] Assignee: AG für industrielle Elektronik AGIE Losone b. Locarno, Losone, Switzerland

[21] Appl. No.: 733,002

[22] Filed: May 10, 1985

[30] Foreign Application Priority Data

May 11, 1984 [CH] Switzerland ............ 2354/84

[51] Int. Cl.⁴ .................. B23H 7/14; G05F 1/44
[52] U.S. Cl. ........................ 219/69 P; 323/287
[58] Field of Search .............. 219/69 P, 69 C;
363/124; 323/287, 290, 222; 204/224 M

[56] References Cited

U.S. PATENT DOCUMENTS

| | | | |
|---|---|---|---|
| 3,052,817 | 9/1962 | Brauker | 219/69 C |
| 3,283,116 | 11/1966 | Scarpelli | 219/69 P |
| 3,289,040 | 11/1966 | Pfau et al. | 323/290 |
| 3,389,300 | 6/1968 | Walter et al. | 219/69 C |
| 3,456,087 | 7/1969 | Hockenberry et al. | 219/69 P |
| 3,466,416 | 9/1969 | Maillet | 219/69 C |
| 3,485,987 | 12/1969 | Porterfield | 219/69 P |
| 3,717,741 | 2/1973 | Verner | 219/69 P |
| 3,745,444 | 7/1973 | Calkin et al. | 323/287 |
| 3,832,510 | 8/1974 | Pfau et al. | 219/69 P |
| 3,893,013 | 7/1975 | Mironoff | 219/69 C |
| 4,004,123 | 1/1977 | Inoue | 219/69 P |
| 4,017,705 | 4/1977 | Bazhenou et al. | 219/69 P |
| 4,060,758 | 11/1977 | Wright | 323/290 |
| 4,163,887 | 8/1979 | Bühler | 219/69 P |
| 4,237,370 | 12/1980 | Ullmann | 219/69 P |
| 4,277,668 | 7/1981 | Inoue | 219/69 C |
| 4,450,337 | 5/1984 | Inoue | 219/69 P |

FOREIGN PATENT DOCUMENTS

| | | | |
|---|---|---|---|
| 71043 | 2/1983 | European Pat. Off. | 219/69 C |
| 2735403 | 8/1981 | Fed. Rep. of Germany | |
| 2547767 | 2/1984 | Fed. Rep. of Germany | |
| 184631 | 11/1982 | Japan | 219/69 C |
| 184629 | 11/1982 | Japan | 219/69 C |
| 58-71031 | 4/1983 | Japan | 219/69 C |
| 196923 | 11/1983 | Japan | 219/69 C |

Primary Examiner—Philip H. Leung
Assistant Examiner—Geoffrey S. Evans
Attorney, Agent, or Firm—Neuman, Williams, Anderson & Olson

[57] ABSTRACT

A pulse generator for spark erosive machining of a conductive workpiece, including a d.c. voltage source, a switching element such as a switching transistor connected in circuit with an inductive coil and the work gap across the voltage source, and a high frequency transformer, where one winding of the transformer is connected in parallel with the voltage source and the other winding is connected in parallel to the series circuit consisting of the inductance coil and the work gap. When the switching element is turned on, a machining pulse is applied to the gap; when the switching is turned off, stored energy in the inductance coil is dissipated across the gap and, owing to the transformer connection, generates a recuperation current flowing into the voltage source. The switching element is preferably controlled on the basis of the magnitude of the current flow through the circuit.

15 Claims, 12 Drawing Figures

PULSE GENERATOR FOR SPARK EROSIVE METAL WORKING

BACKGROUND OF THE INVENTION

The present invention relates to a pulse generator for the spark erosive machining of a conductive workpiece.

A wide variety of pulse generators are used in spark erosion technology. Those with a high efficiency are particularly sought in production technology where power costs, heat production, and equipment size should be minimized.

Although many types of pulse generator are already known for spark erosive machining, all of them suffer from disadvantages, so that improvements in efficiency cannot readily be obtained. Pulse generators are also known which no longer use the previously conventional load resistors for power regulation purposes. One such device is disclosed by German Pat. No. 2,747,767, which describes a generator circuit that can supply randomly shaped current pulses in that a regulating device ensures the pulse current is always in the area between two given envelope curves.

This circuit would be suitable for achieving efficiencies over 60%, but suffers from the disadvantage that high no-load voltages at the spark gap can only be obtained by switching in pulse generators with load resistors. The sharp pulses required by the technology also call for a rapid disconnection device, which in turn takes up all the energy to be dissipated in a load resistor. Thus, the overall efficiency of such pulse generators is undesirable.

German Pat. No. 2,735,403 discloses a pulse generator for wire cutting, which in the case of particularly short pulses of 1 microsecond and less can supply high pulse currents of several hundred amperes. Although this generator type permits a high productivity and high precision, in the case of the conventional design employing a d.c. voltage source of approximately 300 V, the generator efficiency is well below 10% due to the load resistors present. Such an efficiency level is unacceptable for more extensive use in production installations.

SUMMARY OF THE INVENTION

The problem addressed by the present invention is to develop a pulse generator that has a particularly high efficiency and is universally usable for all the machining types occurring in spark erosion technology. According to the present invention, the pulse generator comprises a voltage source; an electronic switching element connected in circuit with an energy storage element such as an inductance coil and the work gap; and a high frequency transformer having one winding in parallel with the inductance coil and work gap and the other winding in parallel with the voltage source. When the switching element is turned on, current can flow from the voltage source through the work gap, inductance coil and switching element. The polarities of the transformer windings are such that when the switching element is turned off, energy stored in the inductance coil can continue to flow through the work gap by way of the first transformer winding, which also causes a recuperation current to flow through the voltage source from the second transformer winding. The operation of the switching element may be regulated in a predetermined manner on the basis of the current flowing in the circuit during a machining pulse. Thus, the profile of the current pulse can easily be shaped, and more than one such circuit may be connected in parallel to provide further flexibility in the shaping of the current pulse.

The pulse generator according to the invention has the advantage that it can be manufactured as a small, lightweight device, while being easily drivable, particularly in conjunction with automatic process control systems. It is also suitable for producing very different types of eroding pulses.

BRIEF DESCRIPTION OF THE DRAWINGS

The invention is described in greater detail hereinafter relative to illustrative embodiments and the attached drawings, which show:

FIG. 3 a circuit diagram of a third embodiment in accordance with the present invention.

DETAILED DESCRIPTION OF THE PREFERRED EMBODIMENTS

Figure 1:
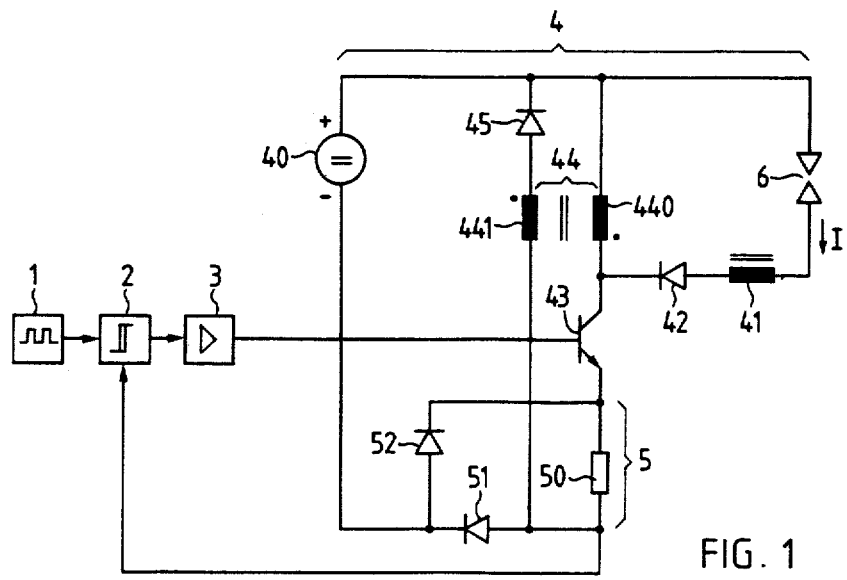
FIG. 1 a circuit diagram of a pulse generator in accordance with the present invention.

FIG. 1 shows the basic principle of the circuit. A d.c. voltage supply 40 is connected to the spark gap 6 across an inductance coil 41, a current sensor 50 and a switching element 43. The current rise rate in ampere/microsecond of current I is proportional to the voltage in Volts of the d.c. voltage supply 40 minus the sparking voltage across the spark gap 6 and inversely proportional to the value of the inductance coil 41 in microhenry. Thus, the current rise rate of the pulse and the no-load voltage of the generator can be easily determined. An upper limit is only set by the inductance of the supply line of spark gap 6, which must be incorporated into the calculation in accordance with conventional methods.

The measuring circuit 5 permits a delay-free determination of the current I. Two diodes 51, 52 are provided for measuring a decreasing current I in current sensor 50. A recuperation current is forced to flow from the negative pole of the d.c. voltage supply 40, across diode 52, current sensor 50 and a second winding 441 of a high frequency transformer 44. The measuring signal is returned to a comparator 2 and has the same shape as the current I, shown for example in FIGS. 1a and 1b. The diodes 51, 52 are unnecessary for pulses according to FIG. 1a where only the maximum value of current I is of interest. The current sensor can comprises a current transformer, or preferably a precision measuring resistor, as proposed in German Patent Application No. P34 05 442.1.

In comparator 2, the measuring signal is compared with a desired value provided by the desired value generator 1. If the measuring signal exceeds the desired value, switching element 43 is switched off through control of driver 3. The section of the pulse generator downstream of the driver 3 is called the generator section 4. Desired value generator 1, comparator 2 and driver 3 are described in detail in the aforementioned German Pat. No. 2,547,767 and are also usable in the present case. The switching element 43 can be a known fast electronic switch, e.g. a bipolar transistor or a MOSFET.

If the current flow across switching element 43 is stopped, the inductance coil 41 becomes the driving energy source in the spark erosive circuit. Current I can then only flow across a first winding 440 of high frequency transformer 44 and through the spark gap 6. Thus, in the second winding 441 is induced a voltage, which is at least the voltage of the d.c. voltage supply 40, thereby permitting a recuperation current across diode 45 back into the supply 40. Most of the energy stored in the inductance coil 41 is consequently returned to the d.c. voltage supply 40, while some of the energy naturally still carries out erosion work in the spark gap 6. The current drop rate in ampere/microsecond of current I now becomes proportional to the voltage in Volts of the d.c. voltage supply 40 transformed in winding 440 plus the sparking voltage in Volts across the spark gap 6 and is inversely proportional to the value of the inductance coil 41 in microhenry. Thus, the current drop rate can be freely selected in view of the transmission ratio of high frequency transformer 44. Special care must be taken in the design of the latter to prevent leakage inductances and additional voltage loading of the switching element 43. Reference is made in this connection to technical paper PC79-S-2 of Rudolf Severns, pp. 17 to 18, read at the POWER CONVERSION Conference in Munich, Germany, 1979. Switching element 43 is to be designed in consideration of the voltage of the d.c. voltage supply 40 plus the voltage thereof transformed in the first winding 440.

It is possible for the purpose of increasing the pulse power to allow several such circuits to act in parallel on a spark gap 6. A diode 42 connected directly downstream of inductance coil 41 in the current flow direction is used to isolate the individual circuits and prevents a recuperation current from flowing between individual circuits.

Figure 1A:
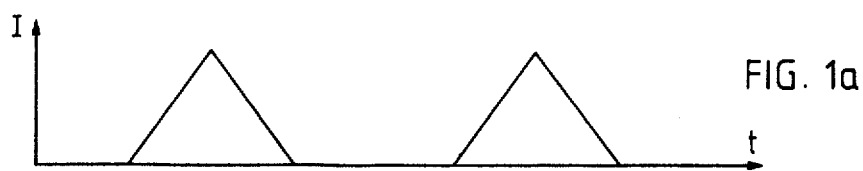
FIGS. 1a and 1b illustrative pulse shapes in two possible operating modes of the embodiment of FIG. 1.
Figure 1B:
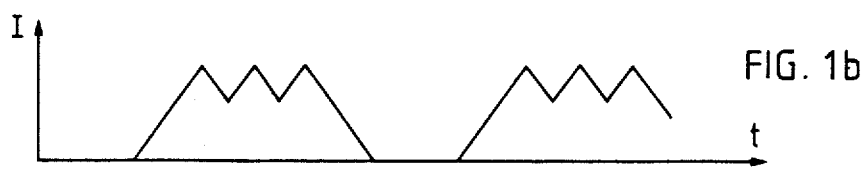

FIG. 1a shows the profile of current waveform I if comparator 2 is only designed as a single position or point controller or regulator. This is understood to mean a comparator which, after reaching its switching threshold, resets a flip-flop and consequently switches off the switching element 43 through driver 3 until the start of the next pulse. FIG. 1b shows a similar current profile with the difference that in this case comparator 2 is designed as a two-position controller. In this case there are two comparators, one for the maximum value and the other for a lower, minimum value. For as long as the desired value generator 1 supplies a desired value which is higher than zero, the flip-flop here is set below the minimum value and is reset over the maximum value.

In this operating mode, special demands are made on diode 45, because at the time in which the switching element 43 is switched on again, the diode 45 still carries a considerable current and naturally has a reverse recovery time. For example, the latter should not exceed an approximate value of 100 nanoseconds. Diodes 51 and 52 can advantageously by Schottky rectifier, because as a result the current conduction losses are lowest and the reverse voltage is below 1 V.

The d.c. voltage supply 40 normally supplies 40 to approximately 1000 V, depending on the technical requirements of the particular machining application (e.g. material, workpiece thickness, desired surface quality). The d.c voltage supply can also be designed variable but then there would also be modifications to the steepness of the pulse edges. Thus, pulse generators can be obtained with pulse edges up to 500 ampere/microsecond, so that an excellent quality level can be achieved during wire erosion. In the present example, the high frequency transformer 44 has a transmission ratio close to 1:1 and consequently provides symmetrical pulse edges. The current sensor 50 is in the form of a measuring resistor; its resistance value is typically on the order of milliohms.

Figure 2:
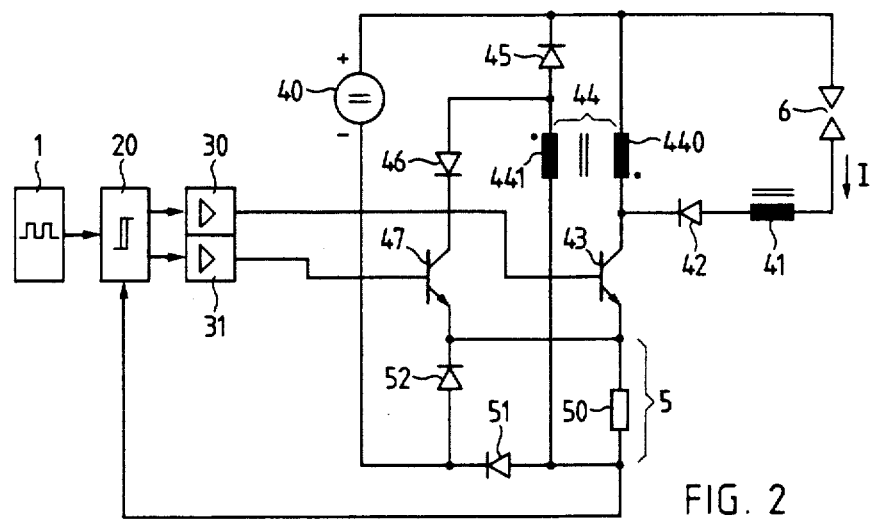
FIG. 2 a circuit diagram of a second embodiment in accordance with the present invention.

FIG. 2 shows a modified embodiment in which the second winding 441 is short-circuited across a further diode 46, a further switching element 47, and current sensor 50. Thus, with the switching element 47 closed and switching element 43 open, the drop rate of the current I in ampere/microsecond is only proportional to the spark voltage in Volts in the spark gap 6 and is inversely proportional to the value of the inductance coil 41 in microhenry. This measure prevents a recuperation in the d.c. voltage supply 40, and the energy from inductance coil 41 is exclusively converted in spark gap 6 for as long as the switching element 47 remains closed. Unavoidable losses in the lines, diodes, switching elements and transformers are comparatively small. However, they essentially determine the efficiency of the circuit.

A major advantage of the described pulse generator compared with the many known pulse generators is that no current flows in the power section during the pulse intervals, so than no power losses can occur. This is very important when cutting with a wire electrode, because then the pulse interval is typically 90% of the total pulse cycle.

Figure 2A:
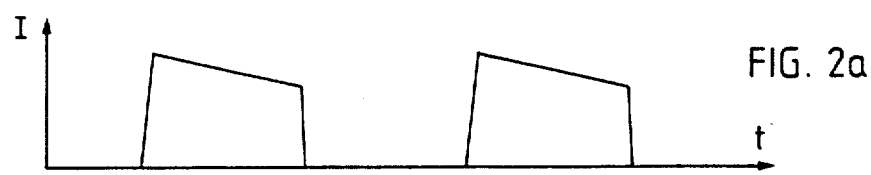
FIGS. 2a and 2b illustrative pulse shapes in two possible operating modes of the embodiment of FIG. 2.

Switching elements 43 and 47 are driven in the same way by means of two identical drivers 30 and 31. For pulses shown in FIG. 2a, use is made of a comparator 20 which operates as a two-position controller, but at a first desired value keeps switching element 43 off and below a second, higher desired value keeps switching element 47 on.

Figure 2B:
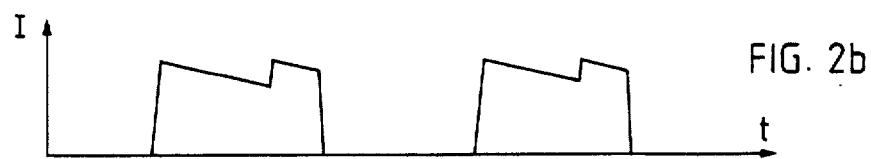

If comparator 20 contains two two-position controllers, pulse trains as shown in FIG. 2b may be obtained. The first two-point controller operates in the manner described in connection with FIG. 1b and operates switching element 43. The second two-point controller switches off switching element 47 below the switch-off desired value of switching element 43 and switches it on at a higher desired value. Comparator 20 can be constructed in the same way as the comparator 20 shown in FIG. 1. The desired value generator 1 need not necessarily supply three different desired values. A single desired value is sufficient and the three different levels can be derived with the aid of voltage dividers.

On operating the circuit according to FIG. 2b, it is also possible to reproduce very complicated desired value signals, such as superimposed pulses as can be used for spark erosive counterstriking. This circuit variant has the important advantage that in the case of considerable edge steepness of current I, it is possible to produce relatively long pulses at a comparatively low switching frequency of switching elements 43 and 47. Naturally, a lower switching frequency gives smaller commutating losses, which has a favorable effect on the pulse generator efficiency.

The variant shown in FIG. 3 has the same objective. It essentially comprises two parallel connected generator sections 4a and 4b, each of which essentially corresponds to the generator section 4 as described relative to FIG. 1. The elements of the two generator sections 4a and 4b are consequently given the same reference numerals as the corresponding elements in the generator section 4, followed by a or b, depending on whether they are associated with generator section 4a or 4b. In addition, the two generator sections 4a and 4b are supplied by the same common d.c. voltage supply 40.

Figure 3A:
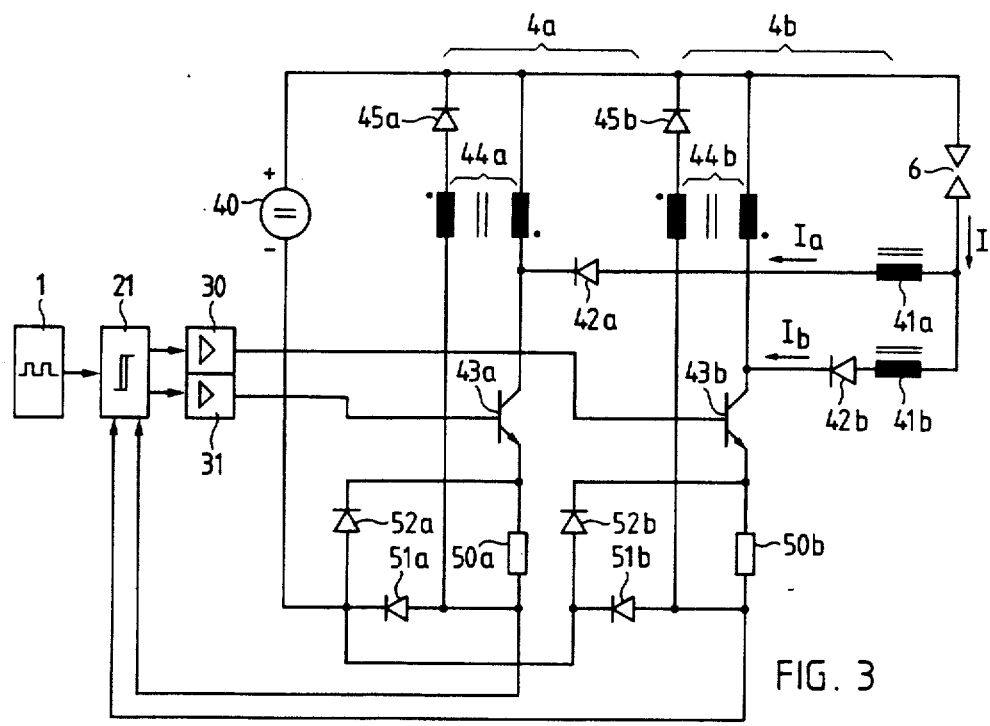
FIGS. 3a, 3b and 3c illustrative pulse shapes obtainable in possible operating modes of the embodiment of FIG. 3.
Figure 3A:
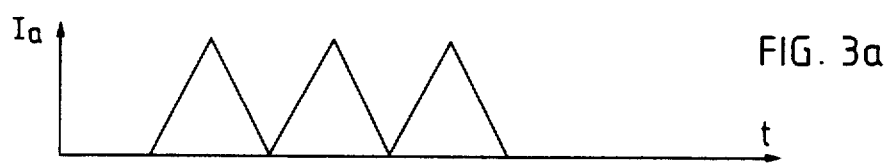
Figure 3B:
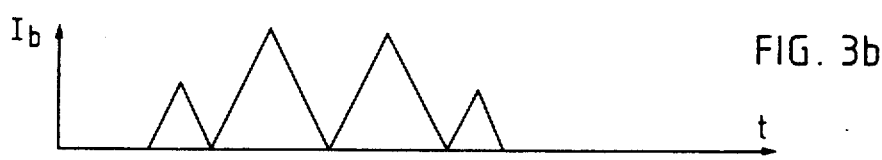
Figure 3C:
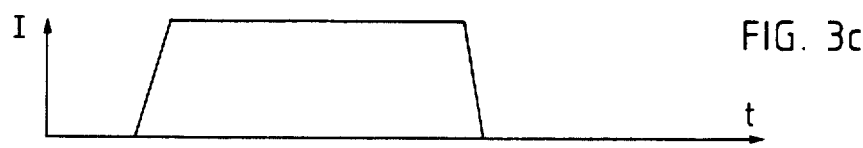

An additional improvement to the generator efficiency can be achieved if the two switching elements 43a and 43b are only switched on again when the two diodes 45a and 45b no longer carry a current, thus preventing considerable commutating losses. An additional advantage is obtained if, as under erosion conditions with a sparking voltage or approximately 25 V, the transmission ratio of the two high frequency transformers 44a and 44b is selected in such a way that identical pulse rise and fall times are obtained. In the ideal case as shown in FIGS. 3a, 3b and 3c, this gives no ripple on the current I. Moreover, the resultant current rise is twice as steep as that of the component currents Ia and Ib.

A comparator 21 comprising two, two-point controllers required to satisfy further conditions is connected between the desired value generator 1 and the two drivers 30 and 31. For the generator section 4a, comparator 21 has a first comparison means which resets a flip-flop if current Ia in current sensor 50a exceeds a desired value received from desired value generator 1, as well as a second comparison means, which sets the flip-flop when current Ia has become approximately zero and the desired value generator 1 provides a desired value greater than zero. For generator section 4b, comparator 21 has the same circuit, except that a further comparison means is provided for comparing the sum of the component currents Ia and Ib with a desired value, being able to reset the flip-flop on exceeding the desired value. Thus, in the simplest possible way, the common mode operation of the two generator sections 4a and 4b at the start of the pulse is changed to a push-pull operation during the pulse. The further elements of this circuit variant correspond to those of FIGS. 1 and 2 and have the same functions. This circuit variant is particularly suitable for rough machining in countersinking processes, where long pulses of high current intensity and steep pulse edges are required.

Figure 4:
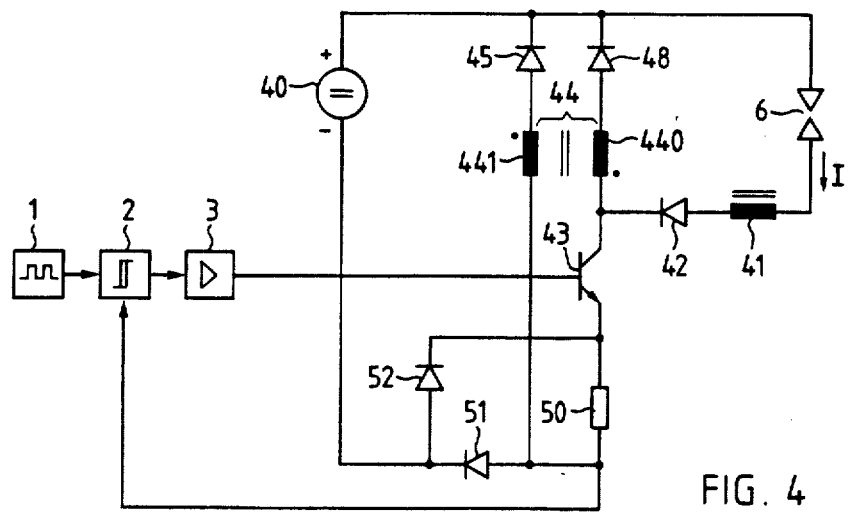
FIG. 4 a circuit diagram of a fourth embodiment.

FIG. 4 shows a further variant of the embodiment shown in FIG. 1. The difference is the addition of a diode 48 connected downstream of the first winding 440 and which prevents a current flow to the first winding 440 from the line connecting the d.c. voltage source 40 and spark gap 6. This diode is introduced to be able to apply randomly long lasting voltage pulses to spark gap 6. Diode 48 prevents a saturation of high frequency transformer 44 during the on time of switching element 43.

The preferred use of this variant is in connection with wire-cut electroerosive machining, where it is particularly suitable for producing a d.c. voltage component independent of the main generator for compensating the erosion forces on the wire electrode. Compared with conventional pulse generators, once again savings of several hundred watts are obtained.

Figure 5:
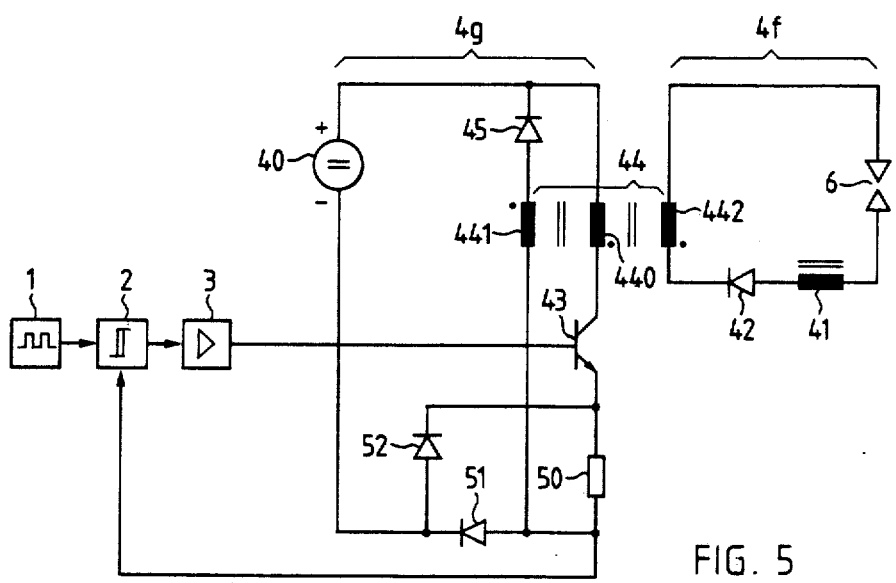
FIG. 5 a circuit diagram of a fifth embodiment with isolation of the discharge circuit.

Finally, FIG. 5 shows a variant of the embodiment shown in FIG. 1 with the difference that a third winding 442 is provided on high frequency transformer 44. The spark gap 6, inductance coil 41 and diode 42 are only connected to winding 442, so that isolation takes place between pulse generator 4g and the spark erosive circuit 4f. This device can be combined with all the aforementioned variants, except that of FIG. 4. Thus, it can be adapted to any conceivable use. The major advantage of such an isolated device is that the pulse generator can be directly operated using the rectified mains voltage. Through the omission of a supply means under the influence of the mains frequency, there is a considerable saving in cost, weight, and size, while affording a further increase in the generator efficiency.

As stated, various circuit variants can be combined with one another, in order to obtain the most optimum solution for a particular application.

What is claimed is:

1. In a spark erosion plant for the machining of a conductive workpiece by a tool electrode, a pulse generator comprising a voltage source for supplying electrical power to the spark gap formed between the workpiece and the tool electrode; a transformer having at least two windings with a first winding and a second winding being connected in parallel with the voltage source as a recuperation transformer, a first end of the first winding and a first side of the spark gap being operatively connected to a first terminal of the voltage source and a second end of the first winding being operatively connected to a second side of the spark gap through an inductor element, the second end of the first winding being further connected to a second terminal of the voltage source through a controllable switching element having a conductive state and a nonconductive state; a unidirectional current conducting element connected in series with the second winding to permit a recuperation current flow from the second winding to the positive terminal of the voltage source; and a drive means connected to the switching element for selectively placing the switching element in the conductive state, so that current can flow from the voltage source through the spark gap, the inductor element, and the switching element when the switching element is in the conductive state and, when the switching element is turned off, current continues to flow through the spark gap by way of the first winding of the recuperation transformer, the latter current being due to the energy stored in the inductor element during the time that the switching element is conductive and causing a recuperation current to flow through the voltage source from the second winding of the recuperation transformer.

2. A pulse generator according to claim 1 further comprising a means operatively connected to the switching element for sensing the current flowing through the switching element, the sensing means also being connected to the drive means; and wherein the drive means is adapted to place the switching element in the nonconductive state when the sensed current flow through the switching element rises above a first predetermined value.

3. A pulse generator according to claim 2 wherein the current sensing means is operatively connected to the second winding to sense the current flowing therethrough, and the drive means is adapted to place the switching element in the conductive state when the sensed current flow through the second winding falls below a second predetermined value lower that the first predetermined value.

4. A pulse generator according to claim 1 wherein the turns ratio of the recuperation transformer is adjustable.

5. A pulse generator according to claim 3 wherein the secondary winding is further connected in a closed circuit loop with a selectively operable second switching element and the sensing means.

6. A pulse generator according to claim 1 wherein a further unidirectional current element operatively is connected in series circuit with the inductor element.

7. A pulse generator according to claim 5 further comprising a second generator circuit connected in parallel circuit to the first described circuit between the voltage source and the spark gap and having the same construction, the two generator circuits being interconnected at a point between the unidirectional current conducting element associated with the current sensing means and the bridging unidirectional current conducting element of each generator circuit, each generator circuit having a unidirectional current conducting element connected in series circuit with its inductor element.

8. A pulse generator according to claim 2 comprising two such generators connected in parallel and sharing the same voltage supply, wherein the current sensing means of each generator circuit is operatively connected to the second winding of that circuit to sense the current flowing therethrough; the drive means of each generator circuit is operatively connected to the sensing means of the generator circuits; and the drive means for each generator circuit is adapted to place its associated switching element in the conductive state when the sensed current flow in the second winding of the other circuit drops to a predetermined value.

9. A pulse generator according to claim 8 wherein the turns ratios of the two recuperation transformers are the same and are chosen so that the rise and fall times of the machining current pulses are approximately the same.

10. A pulse generator according to claim 1 wherein the parallel connection between the first and second windings of the recuperation transformer is galvanic.

11. A pulse generator according to claim 1, further comprising a second switching element having a conductive and a nonconductive state and operatively connected across the second winding of the transformer; a further unidirectional current conducting element connected in series circuit with the second switching element to permit current flow from the positive terminal of the second winding; and a further drive means connected to the second switching elements for selectively placing the second switching element in the conductive state.

12. A pulse generator according to claim 2 further comprising a unidirectional current conducting element connected in series circuit with the current sensing means and a further unidirectional current conducting element connected across the current sensing means and its associated unidirectional current conducting element, one end of the second winding of the recuperation transformer being connected between the current sensing means and its associated unidirectional current conducting element.

13. A pulse generator according to claim 1 further comprising a unidirectional current conducting element connected between the first end of the first winding of the recuperation transformer and its connection to the first terminal of the voltage source.

14. A pulse generator according to claim 1 wherein the operative connections between the second winding of the recuperation transformer and the series circuit of the spark gap and the inductor element is through a third winding of the transformer connected in a closed circuit loop with the spark gap and the inductor element.

15. In a spark erosion plant for the machining of a conductive workpiece by a tool electrode, a pulse generator comprising a voltage source operatively connected in a series, closed circuit with the spark erosion work gap, an inductor element and a controllable switching element having a conductive state and a nonconductive state; and a recuperation transformer having first and second windings, the first winding being operatively connected across the work gap and the inductor element and the second winding being operatively connected in a parallel circuit with the voltage source, so that current can flow from the voltage source through the work gap, the inductor element, and the switching element when the switching element is in a first state and, when the switching element is placed in the second state, current continues to flow through the work gap by way of the first winding of the recuperation transformer, the latter current being due to the energy stored in the inductor element during the time that the switching element is in the first state and causing a recuperation current to flow from the second winding of the recuperation transformer to the positive terminal of the voltage source.

* * * * *

UNITED STATES PATENT AND TRADEMARK OFFICE
CERTIFICATE OF CORRECTION

PATENT NO. : 4,713,516

DATED : December 15, 1987

INVENTOR(S) : ERNST BUHLER and ANTONIO RULLO

It is certified that error appears in the above-identified patent and that said Letters Patent is hereby corrected as shown below:

In Column 1, line 19, German Pat. No. "2,747,767" should be --2,547,767--.

In Column 2, line 60, "comprises" should be --comprise--.

In Column 3, line 66 "by" should be --be-- and "rectifier" should be --rectifiers--.

In Column 4, line 36 "than" should be --that--.

In Column 5, line 21, "or" should be --of--.

In Column 8, line 1, "elements" should be --element--.

Signed and Sealed this

Twenty-eighth Day of June, 1988

Attest:

*Attesting Officer*

DONALD J. QUIGG

*Commissioner of Patents and Trademarks*